United States Patent Office 3,795,629
Patented Mar. 5, 1974

3,795,629
REDUCTION OF COPPER OXIDE WITH NICKEL
John D. Newkirk, Downers Grove, and Louis A. Goretta, Naperville, Ill., assignors to Nalco Chemical Company, Chicago, Ill.
No Drawing. Filed June 5, 1972, Ser. No. 259,731
Int. Cl. B01j 1/40
U.S. Cl. 252—455 R
9 Claims

ABSTRACT OF THE DISCLOSURE

A method of reducing an aqueous slurry comprising cupric oxide and cupric hydroxide and mixtures thereof which comprises reacting said slurry in the presence of hydrogen and a supported nickel catalyst for a period of about 1–6 hours at 80–150° C., and moderate superatmospheric pressure (5–10 atmospheres).

This method produced a convenient product of reduced copper oxide for input to a commercial hydrolysis of nitriles (such as acrylonitrile) to amides.

INTRODUCTION

The present invention relates to a method for the production of a reduced copper oxide which is suitable immediately for utilization as input for commercial catalytic hydrolysis of nitriles such a acrylonitrile to amides such as acrylamide. The present invention consists of reducing cupric oxide, cupric hydroxide, and mixtures thereof in the form of an aqueous slurry by reacting this slurry in the presence of hydrogen with or without a minor amount of a hydroxide and a supported nickel catalyst for a period of about 1–6 hours at from 80–150° C. and moderate superatmospheric pressures (5–10 atmospheres).

This same slurry containing reduced copper oxide catalyst may then be used in a continuous process for the hydrolysis of nitrile to amide as by the addition of acrylonitrile and formation of acrylamide proceeding according to 3,597,481 Tefertiller et al. and 3,631,104 Habermann et al., both to Dow Chemical Company, which are incorporated by reference.

Production of acrylamide by catalytic hydrolysis has received significant patent attention in the current art. For example, 3,631,104 Habermann et al. (Dow) recites the production of reduced copper oxide catalyst at column 3, specially setting out hydrogen reduction. Also of interest is the following literature citation: C. Paal, Berichte, 47, 2202–2209 (1914), which discloses the use of palladium to reduce copper hydroxide and copper oxide containing the sodium salt of protalbinacid.

The present invention is designed as an improvement over the known art in that the reduction of mixed copper oxides and hydroxides may be effected using a nickel catalyst and furthermore, the reduction of the higher oxides or higher valences of copper is achieved in an aqueous slurry so that commercially the same slurry may be utilized as input for commercial hydrolysis of the nitrile.

The term "reduced copper oxide" is similar to that noted at column 3 of the Habermann Pat. 3,631,104 above and indicates a catalyst wherein at least 50 percent of the copper content has been reduced to cuprous oxide.

It is further noted that the cuprous oxide product (red) may contain a minor amount of copper metal and (yellow) cuprous hydroxide. As preferred reactants in the present invention are the black cupric oxide, blue copper hydroxide, and mixtures of the same. Such unreduced copper compounds may be admixed in the natural state with reduced copper oxides in a minor amount and in such case the thrust of the invention is to increase the percentage of reduced copper oxide. The success or efficacy of the process will be evidenced by optical or visual signals such as by the characteristic red color of the cuprous oxide product.

THE SLURRY

As a pre-reactant, a source of cupric ion may be utilized selected from such copper salts as $CuCO_3$, $Cu(OH)_2$, $CuSO_4$, $Cu(NO_3)_2 \cdot 3H_2O$, $CuSO_4 \cdot 5H_2O$, etc., as well as utilizing cupric hydroxide. By well-known techniques as, for example, set out in 2,474,497 Rowe (Lake Chemical Company), the cupric hydroxide is formed by addition of alkali metal hydroxide and the ammonium complex by the addition of ammonium hydroxide.

A typical procedure for the production of the oxides and hydroxides from the salts is heating the ammonia treated salts in alkali metal hydroxide solution at about 70° F., followed by oven drying of the precipitate at from 70–110° C. for at least one hour to remove the fugitive or volatile anions.

The aqueous slurry is prepared by adjusting the water content of the unreduced cupric oxide/hydroxide mix to where the ratio of cupric to water or aqueous in the slurry is in the ratio from about 1:10 to 1:20.

Furthermore, in the formation of the slurry, it has sometimes been found advantageous to add a small amount (1–2% by weight) of modifying heavy metal salts selected from Zn or Fe.

FORMATION OF THE CATALYST

The catalyst of choice in the present invention is a supported nickel catalyst wherein 5–70% by weight of nickel is coated on a carrier. The carriers used in this invention may be any inert clay type material. These clays are well known to the art. A typical clay which is useful in the practice of this invention is kieselguhr clay. Also useful as carriers are silica, alumina or mixtures thereof. It has been found that comparatively the nickel in this form shows yield advantage in nitrile conversion to amide over similar platinum-type catalysts.

Such nickel catalysts are known and commercially available. A typical catalyst is Girdler Corporation's G49A or G49B which are 65% and 50% nickel on kieselguhr clay respectively. The nickel is utilized in catalytic quantities and together with the sodium hydroxide, which may be added to the slurry, is present in about 0.05–0.5% by weight of the slurry containing the reactant unreduced cupric oxide.

In the reduction of the cupric oxide to the active cuprous state, in addition to the presence of the nickel, a closed kettle hydrogen atmosphere is necessary in the process. The reaction advantageously may be carried out at from 80–150° C. and conveniently at a moderately superatmospheric pressure of 5–10 atmospheres or optimally under pressure of 200–240 p.s.i. The preferred temperature range is 100–105° C. The pH is monitored and maintained in the alkaline range by the addition of alkali metal hydroxide and preferably the reaction takes place in a pH between 9.5 and 10.5.

HYDROLYSIS OF NITRILES

It is of commercial note in assessing the present invention that the reduced copper oxide product in slurry form directly from the reduction process may be utilized together with an added nitrile such as acrylonitrile as input to the commercial hydrolysis of such nitrile to give yields of amide ranging from 75–94%.

EXAMPLE 1

1000 g. of cupric carbonate was charged into a stainless steel container and placed in a muffle furnace for 24 hours and 712 g. of cupric oxide were recovered.

A slurry was formed of 880 ml. of DI water and 53 g. of cupric oxide produced above. The pH was regulated with sodium hydroxide to 10.85 and 0.5 g. of 50% nickel on kieselguhr clay carrier was utilized as a catalyst. The cupric slurry was placed under pressure of 203 p.s.i. with input hydrogen and temperature was maintained at 100–103° C. for 3 hrs. 45 min.

At the end of the reaction time period, the pressure was returned to atmospheric and 420 g. of acrylonitrile were added directly into the now-reduced copper oxide slurry. Temperature was raised to about 108° C. and the pH was regulated in the acid range between 7.2 and 7.5 for 6.5 hours.

Analysis for amide showed 96.05% (run 1) and 96.33% (run 2) conversion.

EXAMPLE 2

880 ml. DI water, 53 g. copper II hydroxide from Rocky Mountain Research Corporation and 0.5 g. 50% nickel on kieselguhr clay were placed in a 2-liter autoclave and the pH adjusted to 9.88. Pressure of 202 p.s.i. was utilized with input hydrogen at a temperature of 100–103° C. for 4 hours.

At the end of this time, the pressure was removed and directly into the autoclave was added 420 g. of acrylonitrile. The pH was lowered to 8.84 and a reaction temperature of 107° C. was maintained for about 7.5 hours.

Analysis of conversion to amide was 83.1%.

EXAMPLE 3

To a 5-liter, 3-necked flask was charged the following: 500 g. $CuSO_4 \cdot 5H_2O$, 7.5 g. $FeSO_4 \cdot 7H_2O$, 1500 ml. DI water, and 50 ml. 28% $NH_4OH$. Then was added 170 g. NaOH pellets dissolved in 1500 ml. DI water. The mixture was heated to 70° C. and held for one hour and then oven dried at 110° C.

53 g. of the product from the above (cupric oxide) was mixed and slurried with 880 ml. DI water (boiled) and 0.5 g. of 53% nickel on a silica carrier. The pH was adjusted to 10.3 with a dilute sodium hydroxide solution. The reduction of the cupric ion was effected by utilizing pressure of 230 p.s.i. with hydrogen at a temperature of 102–103° C. for 3 hours.

At the end of 3 hours pressure was reduced to atmospheric and 420 g. of acrylonitrile was added to the product. The new reaction mixture was heated for 4 hours at 108–109° C.

The amide conversion was 94.4%.

EXAMPLE 4

In a manner similar to the experimental procedure of Example 3 with the exception that 0.5 g. of a 60% nickel on a silica-alumina carrier (90:10), a 92.1% conversion was obtained.

EXAMPLE 5

In a manner similar to the experimental procedures of Example 1, the following additional runs were made and the results are summarized herein.

| Input (grams) | Pressure w/$H_2$ (p.s.i.) | pH Range | Amide conversion, percent | Temp. range, °C. | Time, hrs. |
|---|---|---|---|---|---|
| 1,000 $CuCO_3$(CuO) | 202 | 10–85–10.20 | 94.20 | 102–110 | ca 4.5 |
| 53 Cu(OH)$_2$ | 225 | 9.70 | 76.00 | 100–105 | ca 5 |
| 250 $CuSO_4$ | 230 | 10.15–9.60 | 73.05 | 100–102 | ca 5.5 |
| 485 Cu(NO$_3$)$_2 \cdot 3H_2O$<br>4.5 Zn(NO$_3$)$_2 \cdot 6H_2O$ | 230 | 10.50–10.00 | 68.00 | 101–103 | ca 4 |
| 500 $CuSO_4 \cdot 5H_2O$<br>4 $FeSO_4 \cdot 7H_2O$ | 230 | 9.85–9.20 | 83.20 | 98–101 | ca 3 |
| 500 $CuSO_4 \cdot 5H_2O$<br>2 $FeSO_4 \cdot 7H_2O$ | 230 | 9.85–8.65 | 76.80 | 99–100 | ca 3 |
| 500 $CuSO_4 \cdot 5H_2O$<br>8 $FeSO_4 \cdot 7H_2O$ | 230 | 9.90–9.30 | 89.73 | 100–103 | ca 3 |
| 500 $CuSO_4 \cdot 5H_2O$<br>4 $FeSO_4 \cdot 7H_2O$ | 230 | 9.94–9.55 | 74.62 | 102 | ca 2 |
| 500 $CuSO_4 \cdot 5H_2O$<br>8 $FeSO_4 \cdot 7H_2O$ | 230 | 9.75–8.10 | 83.65 | 104 | ca 4.5 |
| 500 $CuSO_4 \cdot 5H_2O$<br>8 $FeSO_4 \cdot 7H_2O$ | 230 | 9.80–8.80 | 90.10 | 103–404 | ca 4 |
| 500 $CuSO_4 \cdot 5H_2O$<br>16 $FeSO_4 \cdot 7H_2O$ | 230 | 9.80–10.60 | 86.31 | 100–105 | ca 3 |
| 500 $CuSO_4 \cdot 5H_2O$<br>16 $FeSO_4 \cdot 7H_2O$ | 230 | 9.80–10.02 | 82.63 | 103 | ca 5.5 |
| 1,500 $CuSO_4 \cdot 5H_2O$<br>48 $FeSO_4 \cdot 7H_2O$ | 230 | 10.45–10.20 | 72.10 | 105 | ca 2.5 |
| 1,500 $CuSO_4 \cdot 5H_2O$<br>25 $FeSO_4 \cdot 7H_2O$ | 230 | 10–15–10.60 | 80.00 | 101 | ca 2 |
| 1,500 $CuSO_4 \cdot 5H_2O$<br>25 $FeSO_4 \cdot 7H_2O$ | 230 | 10.70–10.48 | 86.20 | 100–105 | ca 2.5 |

The embodiments of this invention in which an exclusive property or privilege is claimed are defined as follows:

1. A method of producing a reduced copper oxide catalytically active slurry which comprises reacting an aqueous slurry of cupric oxide or cupric hydroxide or mixtures of cupric oxide and cupric hydroxide in the presence of a nickel catalyst under a hydrogen atmosphere for about 1–6 hours at from 100–105° C. whereby a catalytically active reduced copper oxide slurry is produced.

2. A method according to claim 1 wherein the catalyst is nickel coated on a carrier.

3. The method according to claim 2 wherein the catalyst is nickel coated on a kieselguhr clay carrier.

4. The method according to claim 2 wherein the catalyst is nickel coated on a silica carrier.

5. The method according to claim 2 wherein the catalyst is nickel coated on an alumina carrier.

6. The method according to claim 2 wherein the catalyst is nickel coated on a silica-alumina carrier.

7. The method according to claim 2 wherein the carrier surface is coated with about 5–70% by weight of nickel.

8. The method according to claim 1 wherein the ratio of cupric oxide or cupric hydroxide or mixtures of cupric oxide and cupric to water in the aqueous slurry is about 1:10 to 1:20.

9. The method according to claim 1 wherein the nickel catalyst is about 0.01 to 0.1% by weight of the slurry.

References Cited

UNITED STATES PATENTS

| 3,597,481 | 8/1971 | Tefertiller et al. | 260—561 R |
| 3,631,104 | 12/1971 | Habermann et al. | 260—561 N |
| 3,642,894 | 2/1972 | Habermann et al. | 260—561 N |

PATRICK P. GARVIN, Primary Examiner

A. P. DEMERS, Assistant Examiner

U.S. Cl. X.R.

252—459, 466 J, 474, 476; 260—561 N, 561 R